INVENTOR.
Robert P. MacKenzie
William D. Worrell
BY C.R. Meland

His Attorney

United States Patent Office 3,314,060
Patented Apr. 11, 1967

3,314,060
FLUID LEVEL INDICATOR
Robert P. MacKenzie, Muncie, and William D. Worrell, Anderson, Ind., assignors to General Motors Corporation, Detroit, Mich., a corporation of Delaware
Filed Apr. 6, 1964, Ser. No. 357,632
4 Claims. (Cl. 340—244)

This invention relates to electrically operated fluid level indicators and more particularly to a transistorized fluid level indicating system.

With the trend to more maintenance free automobiles and less frequent under hood checks, inspection of the electrolyte level in a battery and a coolant level in a radiator becomes a problem. Present day automobiles may be driven hundreds of miles before an inspection of the battery electrolyte level or the coolant level is made. Also, the placement of batteries in more inaccessible places makes visual checks of the electrolyte level even more difficult.

It is an object of the present invention to provide an improved electrolyte level indicator for a storage battery wherein no inductive voltage is produced during operation of the system and no arcing of switch contacts.

It is a further object of the present invention to provide an improved fluid level indicator that has low current flow requirements.

It is still another object of the present invention to provide an improved fluid level indicating system that has no moving parts.

It is yet another object of the present invention to provide an improved fluid level indicating system that is inexpensive to manufacture and can be readily installed on fluid containers of common design.

It is a further object of the present invention to provide a fluid level indicator that will not provide a false indication when the fluid level is disturbed while the vehicle is in motion.

Further objects and advantages of the present invention will be apparent from the following description, reference being had to the accompanying drawings wherein preferred embodiments of the present invention are clearly shown.

Figure 1:
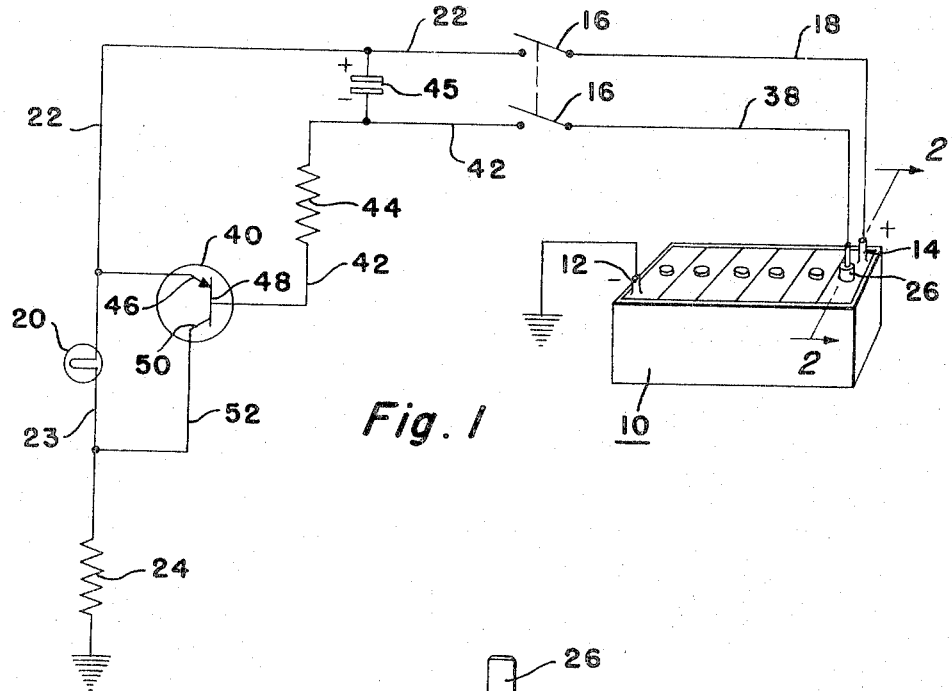
FIGURE 1 is a diagrammatic view of one embodiment of the present invention shown in a system measuring the electrolyte level in a storage battery.

Referring now to FIGURE 1, a storage battery, generally designated by the numeral 10, is shown with its negative terminal 12 going to ground. A positive terminal 14 is connected to an ignition switch 16 through a line 18. The ignition switch 16 is in conductive relationship with an indicating light 20 through a lead 22. A load resistor 24 is connected between one side of the indicating light 20 and ground.

Figure 2:
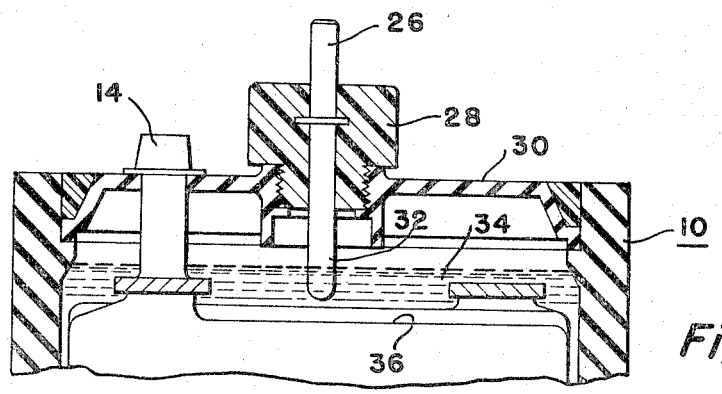
FIGURE 2 is a sectional view taken along line 2—2 of FIGURE 1.

Referring now to FIGURE 2, a probe 26 is disposed through a battery filler cap 28 which is mounted through a wall 30 of the battery 10 in a conventional manner. A portion 32 of the probe 26 is disposed in the battery down to the level which is determined to be the minimum acceptable level for the electrolyte solution 34 therein. Probe 26 can be suspended at any level within a battery and, depending on a given design, will be in any position relative to a plate 36, it being understood that the portion 32 of the probe 26 should be suspended above the plate 36 so that the electrolyte level will not be allowed to recede below the top level of the plates 36.

Referring now to FIGURE 1, the probe 26 is in electrical relationship with the ignition switch 16 through a line 38. The ignition switch 16 is in conductive relationship with a transistor 40 through a line 42. It is understood that the transistor 40 can be of any type that allows a switching action to take place but is preferably a "PNP" type which is hereinafter referred to as a current responsive means. A load resistor 44 is disposed in the line 42 between the transistor 40 and the ignition switch 16. A capacitor 45 is disposed between the lead 22 and the line 42 and will function in a manner to be hereinafter described.

The transistor 40 is forward biased while operating by a negative potential on the base 48 which is established by a current flow through the line 22, emitter to base junction of transistor 40 and then through resistor 44 to the probe 26. It is clearly seen in FIGURE 1 that the collector 50 of the transistor 40 is connected by line 52 to the line 23 which connects the indicating means 20 to ground through resistor 24.

In operation, the ignition switch 16 will be disposed in the normal electrical system of an automobile and will be drawn to the closed position. Thereafter, if the electrolyte in the battery 10 is surrounding an extension 32 of the probe 26, electrons will flow from the probe 26, through the line 38, through the ignition switch 16, through the line 42, through the collector of transistor 40, through the resistor 24 and cause the base 48 of the transistor 40 to be biased in a negative manner with respect to the emitter 46. At the same time, a current path will be established from the positive terminal 14 of the battery through the ignition switch 16, through the line 22 to the emitter 46 of the transistor 40, thereby resulting in the emitter 46 being biased in a positive manner with respect to the base 48. In this situation, the transistor 40 becomes conductive and forms a closed circuit between the emitter 46 and the collector 50, thereby shunting current around the indicating light 20. The light 20 will not operate under these circumstances. It should be noted that, as the ignition switch 16 is closed, the capacitor 45 will be initially charged with the polarity shown. The capacitor 45 serves as a time delay means which will hold the transistor conductive for two or three seconds after the electrolyte moves out of contact with the end 32 of probe 26. This time delay prevents sloshing of the electrolyte from energizing the signal lamp.

Referring now to FIGURE 1, if the ignition switch 16 is closed and the electrolyte level in the battery 10 has dropped below the extension 32 of the probe 26, no electrical current will flow through the line 38 from the probe 26 and, therefore, the base 48 of the transistor 40 will not receive a biasing voltage. In this situation, current will flow from the positive terminal 14 of the battery through line 18, through the ignition switch 16, through the line 22 to the indicating means 20 and on to ground through the resistor 24 and line 23. It is readily seen that the emitter 46 of the transistor 40 will not be biased with respect to the base 48 and no current will flow. Therefore, the transistor will not pass current and will be effectively an opening in the circuit. The current through the indicating light 20 will increase until it becomes incandescent, thereby indicating that the electrolyte level of the battery has dropped below a minimum predetermined level. The resistor 44 limits transistor base current while resistor 24 limits collector current when transistor 40 is conductive. Resistor 24 develops a voltage drop when transistor 40 is non-conductive.

Figure 3:
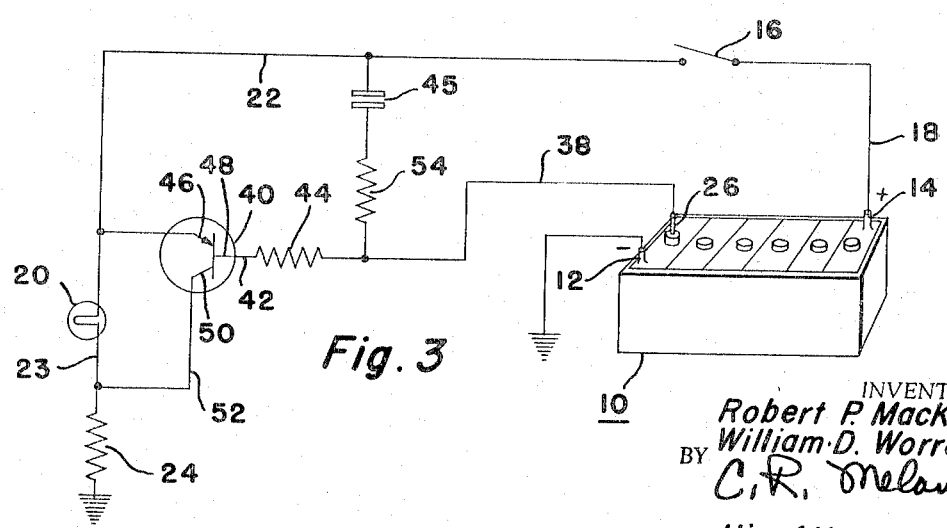
FIGURE 3 is a diagrammatic view of another embodiment of the present invention shown in a system measuring the electrolyte level in a storage battery.

Another embodiment of the subject invention is shown in FIGURE 3. The same reference numerals are used in this embodiment for corresponding parts as were used in the first embodiment. In this embodiment, the probe 26 is shown in a more negative cell of the battery and a single pole switch 16 is substituted for the double pole switch 16 of FIGURE 1. A resistor 54 has been added to reduce the rate of charge of the capacitor 45 thereby allowing use of a smaller and less expensive capacitor.

The operation of the level indicator illustrated in FIGURE 3 is exactly the same as the previous embodiment but allows utility of the subject invention in automobiles having a single pole ignition switch.

It is important that minimum current flow be established in an indicating circut of the type previously described in order to avoid an accidental ignition of the hydrogen gas normally passing through the vents of the battery and to prevent dissociation of the electrolyte.

The utility of the present invention becomes obvious in an environment where it is used to measure the electrolyte level of the battery. However, it is understood that a similar system could be utilized to measure the level of a coolant in the radiator or in a cooling system of an automobile. In this case, the probe 26 would be disposed in the coolant down to a predetermined minimum level in much the same manner as described previously in the application of an indicating system for the electrolyte in a battery. In the environment of a cooling system, the circuit would operate in much the same manner as previously described.

A feature of the present invention having particular utility is the function of the capacitor 45. It is common in the operation of motor vehicles that the electrolyte in a battery will slosh back and forth during motion of the automobile. When the electrolyte level is above the minimum acceptable level but has receded somewhat, the extension 32 of the probe 26 could, at some time, become exposed and indicate a false reading of a low electrolyte level. Due to the discharging of the capacitor 45, a two to three second delay, for example, can be incorporated into the operation of the indicating light 20 in the circuit described.

It is also a particular point of utility that a low current flow be established in the circuit. One reason, as previously stated, was the need for keeping current flow at a minimum due to the normal discharge of hydrogen from the battery. Another very important reason for a low current flow is to reduce the amount of water dissociated in a cell in which the probe is located. This minimum current flow also has the advantage of keeping electrolytic corrosion in the battery to a minimum.

Another point of utility is the inexpensive nature of the device both in manufacture and in maintaining. A relatively few parts allow the manufacture at a very moderate cost. At the same time, the use of a transistor precludes the necessity for changing parts that have become worn due to movement thereof and also the problem of pitting of contacts which might be associated with other systems using switching means.

While the embodiments of the present invention as herein disclosed, constitute preferred forms, it is to be understood that other forms might be adopted.

What is claimed is as follows:

1. A fluid level indicator comprising; an electrical power source, electrical indicating means connected between said power source and ground, a fluid container conductively engaging said power source and ground, and current responsive means adapted to short out the indicating means when current flows through a fluid in the fluid container into said current responsive means, said current responsive means is a transistor that is normally conducting, said transistor becoming non-conductive when the fluid level recedes below a predetermined desired level.

2. An electrolyte level indicating system for an automobile storage battery comprising; an indicating means disposed in conductive relationship with one pole of the battery, the opposite pole of the battery going to ground, a probe disposed through one wall of the battery down to a point determined to be the minimum acceptable level for electrolyte therein, transistor means electrically positioned between said probe and ground for selectively shorting said indicating means, and time delay means disposed between the probe and the indicating means for delaying the operation of the transistor means, the probe and the transistor means conductively positioned in an electrical circuit between the battery and ground thereby acting to short out the indicating means as long as current flows through the electrolyte into the probe.

3. An electrolyte level indicating system according to claim 2 wherein the time delay means is a capacitor and resistor load therefor.

4. A fluid level indicating system comprising; an electrical power source, indicating means operated by electrical current from said power source, the indicating means and the power source being connected to a common ground, a fluid container through which electrical current is disposed to pass from said power source, probe means suspended in said fluid container to a point determined to be the minimum acceptable fluid level, and transistor means being disposed in a circuit from said probe means to the common ground, said transistor means being disposed electrically in parallel with said indicating means, the emitter of said transistor being normally in a closed circuit with respect to the base when current flows through the probe means thereby providing the base of the transistor with an opposite polarity from the emitter, the emitter to base action ceasing when the lower end of the probe means becomes suspended above the fluid level in the container, the transistor thereby becoming an open circuit and allowing electrical current to flow through the indicating means to provide an indication of a drop of the fluid level in the container below the minimum acceptable level.

References Cited by the Examiner

UNITED STATES PATENTS

| | | | |
|---|---|---|---|
| 2,779,015 | 1/1957 | Walker et al. | 340—249 |
| 2,836,808 | 5/1958 | Walker | 340—249 |
| 3,157,879 | 11/1964 | Marmino et al. | 340—249 |

NEIL C. READ, *Primary Examiner.*

D. MYER, *Assistant Examiner.*